Nov. 25, 1969  J. E. HATCHER  3,480,405

FLUID-COOLED CATALYST SUPPORT STRUCTURE

Filed Oct. 26, 1966

INVENTOR
JOHN E. HATCHER

BY *John D. Schmidt*

ATTORNEY

United States Patent Office 3,480,405
Patented Nov. 25, 1969

3,480,405
FLUID-COOLED CATALYST SUPPORT STRUCTURE
John E. Hatcher, Wilmington, Del., assignor to E. I. du Pont de Nemours and Company, Wilmington, Del., a corporation of Delaware
Filed Oct. 26, 1966, Ser. No. 589,658
Int. Cl. B01j 9/00; F28f 21/04
U.S. Cl. 23—288                6 Claims

ABSTRACT OF THE DISCLOSURE

A catalyst support structure comprising a cooling means, said cooling means having passages therethrough, ceramic ferrules positioned in said passages, a ceramic filling surrounding a portion of the ferrules that extend beyond the upstream end of the cooling means, said ceramic filling being in contact with the cooling means and with a metal screen.

---

This invention relates to catalyst support structures, and, more particularly, to a fluid-cooled catalyst support structure for use in high-temperature, gas-phase reaction chambers.

In high temperature catalyzed reactions of gaseous mixtures, such as those employed in the manufacture of hydrogen cyanide and nitric oxide, ammonia is reacted with oxygen by passing a controlled gas mixture through a bed of platinum or platinum alloy catalyst that usually is in the form of a multilayered flat pad of fine mesh screens woven of platinum or platinum alloy wire and is supported by a metallic grid or other structure. The reactions are carried out at temperatures of 900°–1300° C. or above and at somewhat elevated pressure (e.g., up to 150 p.s.i.g.). At these temperatures, especially at temperatures above 1000° C., even many temperature-resistant alloys lose strength to a degree that metallic catalyst support structures become distorted, especially under stress, and hence unserviceable.

A further difficulty encountered in some types of reactors, e.g., in HCN manufacture, is corrosion of the catalyst-supporting structure, resulting in poisoning of the catalyst through contact with the corroding support structure. A foraminous ceramic grid instead of a metal support has been used to overcome this difficulty, but such a support is extremely brittle and difficult to manufacture. Another attempted solution has been to provide a layer of granular vitreous silica or crushed natural beryl between the metal supporting means and the gauze catalyst. The granular material, however, does not provide a smooth enough surface to prevent damage to the hot catalyst gauzes unless the granular material is so fine as to impede the flow of gases through the catalyst bed and consequently create an undesirable back-pressure above the gauze. Furthermore, degradation and thermal distortion of the underlaying metal support structure still occurs.

In an attempt to overcome this fundamental difficulty and to provide a contact surface compatible with the platinum alloy catalyst, a water-cooled metal catalyst support structure has been utilized in the manufacture of HCN. This cooling means is surmounted by a layer of ceramic drip tiles, the drip tiles in turn are covered by a ceramic honeycomb, and it is this surface that comes in contact with the catalyst. However, this non-flexible ceramic honeycomb gradually disintegrates in high temperature service, collapses, and thereby causes cracks in the catalyst gauze, resulting in by-passing of unreacted gases.

Therefore, a need still exists for a catalyst support structure which is suitable for high-temperature reactions and which will function for long periods of time without distortion and without poisoning the catalyst.

Such a catalyst support is provided in accordance with this invention by a structure comprising a cooling means having passages through said cooling means, ceramic ferrules positioned within said passages and held in engagement with said cooling means, a ceramic filling surrounding a portion of said ferrules extending beyond the upstream end of said cooling means, said ceramic filling being in contact with said cooling means and with at least one substantially plane, corrosion resistant metal screen.

In the catalyst support of the instant invention the ferrules are generally supplied with a means for positioning them within said passages, said positioning means preferably comprising integral beads or collars which engage said cooling means. Said cooling means serves to support both the ceramic ferrules and the ceramic filling, and the cooling of a circulating fluid prevents weakening and distortion of the cooling means by the high temperatures of the reaction mixture. The ceramic ferrules are substantially centrally positioned within said passages, usually providing a gap of about from 0.05 to 0.25 cm. between the lateral surface of the cooling means and the wall of the ferrule. The reaction products, therefore, are only slightly cooled on passing through the support structure. The ferrules preferably extend downstream through the full length of said cooling means and extend upstream from the upstream end of the cooling means, all upstream extentions of said ferrules terminating substantially in a single plane at or below the surface of the ceramic filling.

The ceramic filling preferably surrounds the upstream extentions of said ferrules and terminates in substantially the same plane as the several ferrules. In contact with the upstream end of this ceramic structure is at least one substantially plane, corrosion-resistant, pressure and temperature resistant, metal screen on which the catalyst gauze rests.

The cooling means which supports the ceramic filling can comprise a flanged metallic casing having two separate but parallel tube sheets, positioned substantially perpendicular to the flow of the reaction mixture and integrally joined to the wall of said casing; said tube sheets being interconnected by a multiplicity of metallic tubes the ends of which are integrally attached to the respective tube sheets, the upstream tube sheet being recessed from the upstream end of said casing; a means for entry of a cooling fluid from outside said casing into the space between said tube sheets, distribution of said fluid about said tubes, and exit of said fluid from said space.

The complete structure offers physical support for catalysts used in the manufacture of nitric oxide, nitric acid and hydrogen cyanide. It minimizes folding, cracking and perforation of said gauzes, and is compatible with and conserves the catalytic activity of the catalyst. Although the structure of the instant invention is described here primarily with regard to a platinum alloy catalyst, it is understood that this catalyst support structure may be used with any catalyst, and is particularly suitable for use with high temperature catalysts. Of those, the noble metals, especially platinum, palladium and rhodium, and their alloys are particularly preferred.

To facilitate a more detailed description of the invention, reference is made to the accompanying drawings, FIGURES 1, 2, and 3.

Like numbers are used for identical parts in all of the appended figures. The direction of flow of gases through the reaction vessel and through a catalyst-supporting structure of the invention is indicated by arrows.

Figure 1:
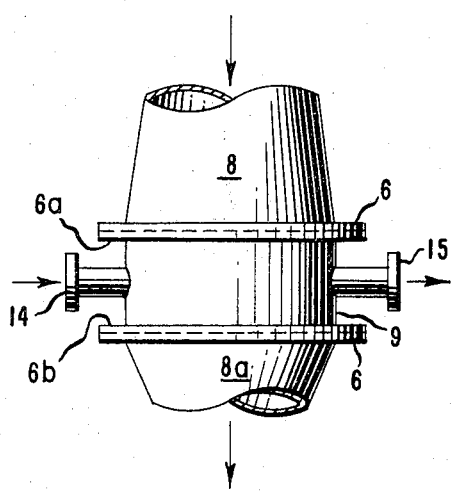
FIGURE 1 is an exterior view of a catalyst-supporting structure of the present invention installed between the upstream and downstream flanges of a conventional converter used in the manufacture of hydrogen cyanide or nitric acid.

FIGURE 1 shows the catalyst support of this invention in place between the upstream 8 and downstream 8a sections of the reaction vessel. The exterior wall 9 can be constructed of any metal or alloy which has sufficient strength at the operating temperature and pressure, e.g., 900°–1300° C. and from about atmospheric pressure to 150 p.s.i.g. These can include any of the group VIII metals, e.g., iron, nickel, cobalt, or their alloys. Alloys of iron are preferred, particularly those in which the alloying elements comprise primarily chromium and nickel, usually in combination with lesser amounts of one or more of tungsten, silicon, carbon, magnesium, and other components. Especially preferred are stainless steels containing up to 75% iron, up to 30% chromium, and up to 22% nickel. Upstream and downstream flanges 6a and 6b mate with flanges 6 of the reaction vessel. Flange nozzles 14 and 15 provide for entry and exit of the cooling fluid.

The cooling medium used in this support structure can be any stable fluid, including gases such as air, nitrogen, methane, helium, and liquids such as water, oil, "Dowtherm" (73.5% diphenyl oxide and 26.5% diphenyl), and mercury. Water is especially preferred because of its high heat capacity, low cost and ready availability.

Figure 2:
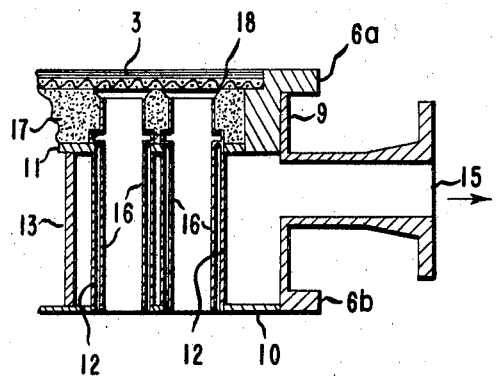
FIGURE 2 shows in detail a portion of the cross-section of a catalyst-supporting structure of this invention.
Figure 3:
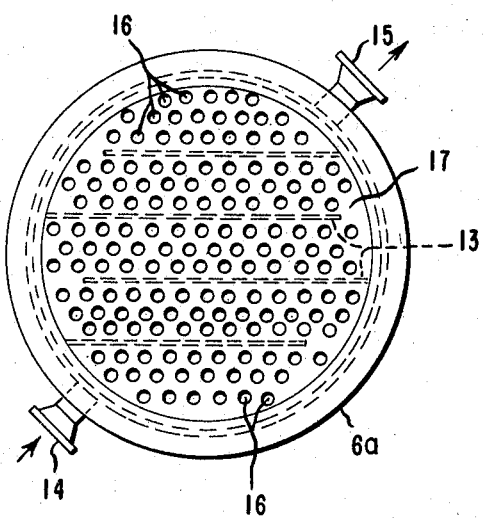
FIGURE 3 shows an upstream plan view of a catalyst-supporting structure of this invention.

FIGURES 2 and 3 show the interior construction of the catalyst support. The lower or downstream tube sheet 10 is substantially in the plane of the face of downstream flange 6b, or is recessed slightly therefrom, and upper tube sheet 11 is parallel to lower tube sheet 10 and located about ⅓ of the distance from upper flange 6a to lower flange 6b, and substantially below the plane of the upper face of flange 6a. The tube sheets can be made of the same material as the exterior wall of the structure. Metal tubes 12 are welded in place in tube sheets 10 and 11. The tubes are preferably constructed of a corrosion-resistant metal, which can be the same as those preferred for use in the exterior walls of the support structure as indicated above. The number and diameter of the tubes varies according to the desired rate of flow of the reaction mixture, but usually is about from 100 to 200 tubes, each of said tubes having diameter of about from 2 to 8 cm. Baffles 13 direct the flow of cooling fluid from inlet nozzle 14 in a sinuous path about tubes 12 to exit nozzles 15.

Into each tube 12 is inserted a beaded ceramic ferrule 16, the bead of which rests on the upper tube sheet. The ferrules can be made of any high-temperature refractory, such as fireclays, silica refractories and alumina refractories composed primarily of silica, alumina, lime and magnesia, optionally with lesser amounts of iron oxide, alkalies, titania, chromite, and other impurities. Silica refractories of at least 95% silica and high alumina refractories of at least 60% alumina are preferred. A high alumina refractory having at least 95% alumina is especially preferred due to its particularly good refractoriness.

Each ferrule preferably extends at least through the length of the passageway through the said cooling means, and preferably extends in an upstream direction substantially to the face of refractory 17. The ceramic ferrules 16 are substantially centered within tubes 12, and the space above upstream tube sheet 11 and around the extensions of the ceramic ferrules 16 is filled with a high crushing strength refractory 17. For ease of manufacturing, this refractory can be cast and cured in place. The refractory can be of the same type as that used in the ferrules as indicated above.

At least one coarse mesh supporting screen 18 of a corrosion-resistant, temperature-resistant metal alloy is placed on the upstream surface of the cured refractory, the upstream surface of said screen preferably being substantially level and in the plane of the face of upstream flange 6a, or a stepped down portion thereof, and the catalysts 3 are placed in the upstream surface of the supporting screens. The materials from which the supporting screens can be manufactured include, for example, corrosion-resistant alloys of Group VIII metals, preferably those containing at least 50% of iron or cobalt and lesser percentages of one or more of nickel, tungsten, chromium, silicon, carbon, and magnesium. Especially preferred are stainless steels containing up to 30% chromium, up to 22% nickel, and less than 74% iron; and an alloy of cobalt, chromium and tungsten in about 55:36:6 weight ratio.

The periphery of the catalyst gauzes and the supporting screens are preferably cushioned and insulated with gaskets and held in place between flange 6a of fluid-cooled catalyst support structure and the converter-body flange 6.

In use of the preferred structure of this invention, water or other coolant passes between tube sheets 10 and 11 around tubes 12, thus keeping the temperature of the catalyst-supporting structure well below that which would cause distortion of the structure. Thermal insulation of the cooled structure from the reaction mixture is provided by the cast refractory, the refractory ferrules, and the free space between the metal tubes 12 and refractory ferrules 16, thereby not substantially reducing the temperature of the oxidation products or power recovery from them.

I claim:

1. An improved catalyst support structure comprising a cooling means having passages for a reaction mixture through said cooling means, ceramic ferrules positioned within said passages and held in engagement with said cooling means, a ceramic filling surrounding a portion of said ferrules extending beyond the upstream end of said cooling means, said ceramic filling being in contact with said cooling means and with at least one substantially plane, corrosion resistant metal screen.

2. The catalyst support structure of claim 1 wherein said ferrules bear a means for retention within said passages, are substantially centrally positioned within said passages, extend at least about the full length of said cooling means and extend in an upstream direction from the upstream end of said cooling means.

3. The catalyst support structure of claim 2 wherein said ceramic filling terminates in substantially the plane encompassing the ends of said ferrules and surrounds the portions of said ferrules which project beyond said upstream end of said cooling means.

4. The catalyst support structure of claim 3 wherein said cooling means comprises a metal casing having two separate but parallel tube sheets, positioned substantially perpendicular to the flow of the reaction mixture and integrally joined to the wall of said casing, said tube sheets being interconnected by a multiplicity of metal tubes the ends of which are integrally attached to the respective tube sheets, the upstream tube sheet being recessed from the upstream end of said casing; and means for entry of a cooling fluid from outside said casing into the space between said tube sheets, distribution of said fluid about said tubes, and exit of said fluid from said space.

5. The catalyst support structure of claim 4 wherein said ferrules are positioned so as to provide a gap of about from .05 to .25 cm. between the ferrule and the tube wall and the diameter of the ferrules is about from 2 to 8 cm.

6. The catalyst support structure of claim 5 wherein said ferrules are composed of a refractory containing at least 95% alumina.

References Cited

UNITED STATES PATENTS

| | | | |
|---|---|---|---|
| 2,017,676 | 10/1935 | Von Girsewald et al. | 165—180 X |
| 3,073,685 | 1/1963 | Grove et al. | 23—288 |
| 3,215,495 | 11/1965 | Jenks et al. | 23—288 X |

JOSEPH SCOVRONEK, Primary Examiner

U.S. Cl. X.R.

165—180